(12) United States Patent
Chen et al.

(10) Patent No.: US 6,781,525 B2
(45) Date of Patent: Aug. 24, 2004

(54) SHARED INTERFACE DEVICE

(75) Inventors: Chien Chih Chen, Taipei Hsien (TW); Wen Kuan Lin, Taipei (TW)

(73) Assignee: Lite-On Technology Corporation, Taipei (TW)

( * ) Notice: Subject to any disclaimer, the term of this patent is extended or adjusted under 35 U.S.C. 154(b) by 491 days.

(21) Appl. No.: 09/983,136

(22) Filed: Oct. 23, 2001

(65) Prior Publication Data

US 2003/0076243 A1 Apr. 24, 2003

(51) Int. Cl.[7] ................... H03M 11/00; H03K 17/94
(52) U.S. Cl. ................ 341/22; 361/686; 710/303
(58) Field of Search .............. 341/22, 26; 361/679, 361/686; 710/303, 304, 305

(56) References Cited

U.S. PATENT DOCUMENTS

| | | | | |
|---|---|---|---|---|
| 5,020,090 A | * | 5/1991 | Morris | 455/556.1 |
| 5,367,563 A | * | 11/1994 | Sainton | 379/93.29 |
| 5,753,982 A | * | 5/1998 | Yeh | 307/139 |
| 6,098,127 A | * | 8/2000 | Kwang | 710/62 |
| 6,375,344 B1 | * | 4/2002 | Hanson et al. | 710/303 |
| 6,466,437 B1 | * | 10/2002 | Sakuragi et al. | 361/686 |
| 6,683,786 B2 | * | 1/2004 | Yin et al. | 361/686 |
| 6,718,408 B2 | * | 4/2004 | Esterberg et al. | 710/62 |
| 2002/0095533 A1 | * | 7/2002 | Esterberg et al. | 710/8 |
| 2002/0119685 A1 | * | 8/2002 | Gardenfors et al. | 439/86 |

FOREIGN PATENT DOCUMENTS

JP    08123593 A  *  5/1996  ............. G06F/3/00

* cited by examiner

*Primary Examiner*—Timothy Edwards
(74) *Attorney, Agent, or Firm*—Rosenberg, Klein & Lee

(57) ABSTRACT

A shared interface device provides connection between a portable electronic device and a peripheral unit. The shared interface device comprises a switch and an energy-storing element. The switch has a terminal connected to a TxD/POWER pin of the portable electronic device and an RxD pin of the peripheral unit, and another terminal connected to a VCC pin of the peripheral unit. The switch is ON/OFF when the TxD/POWER pin of the portable electronic device is HI/LO. The energy-storing element has one end connected to another end of the switch to supply electrical power to the peripheral unit and another end connected to ground. The energy-storing element is charged when the switch is ON and used as a backup power supply when the switch is OFF.

6 Claims, 5 Drawing Sheets

SHARED INTERFACE DEVICE

FIELD OF THE INVENTION

The present invention relates to a shared interface device, especially to a shared interface device connected between a portable electronic device and a peripheral unit.

BACKGROUND OF THE INVENTION

The current portable electronic devices such as personal digital assistants (PDA) and cellulous phones are often connected to peripheral unit such as keyboard for inputting data. In those portable electronic devices, the power transmission function and the signal transmission function are generally assigned at different pins.

As shown in FIG. 1, conflict is occurred if the power transmission function and the signal transmission function are assigned at the same pin 8 of a portable electronic device 1a. When a peripheral unit 2a is connected to the portable electronic device 1a and powered by the portable electronic device 1a through the pin 8 of the portable electronic device 1a, the peripheral unit 2a can only send data to the portable electronic device 1a and cannot receive data from the portable electronic device 1a because the transmitting data pin and the power supplying pin of the portable electronic device 1a are defined at the same pin 8. Therefore, the peripheral unit 2a cannot communicate with the portable electronic device 1a in bidirectional fashion.

Moreover, if the pin 8 of the portable electronic device 1a is functioned to transmit data to the peripheral unit 2a, the peripheral unit 2a cannot be powered by the portable electronic device 1a. This is inconvenient for user.

SUMMARY OF THE INVENTION

It is the object of the present invention to provide a shared interface device connected between a portable electronic device and a peripheral unit, wherein both the power supplying function and the data transmission function can be assigned to one pin with no confliction and bi-directional data transmission is possible.

To achieve the above object, the present invention provides a shared interface device having a switch and an energy-storing element and arranged between a portable electronic device and a peripheral unit. When a TxD/POWER pin of the portable electronic device is HI and there is no transmitted data, the switch is ON to provide electric power to the peripheral unit and charge the energy-storing element. Moreover, when there is transmitted data present and the TxD/POWER pin of the portable electronic device is LO, the switch is OFF and the energy-storing element is functioned as backup power supply of the peripheral unit. Moreover, when there is transmitted data present and the TxD/POWER pin of the portable electronic device is HI, the switch is ON to provide electric power to the peripheral unit and charge the energy-storing element.

The various objects and advantages of the present invention will be more readily understood from the following detailed description when read in conjunction with the appended drawing, in which:

DETAILED DESCRIPTION OF THE INVENTION

Figure 1:
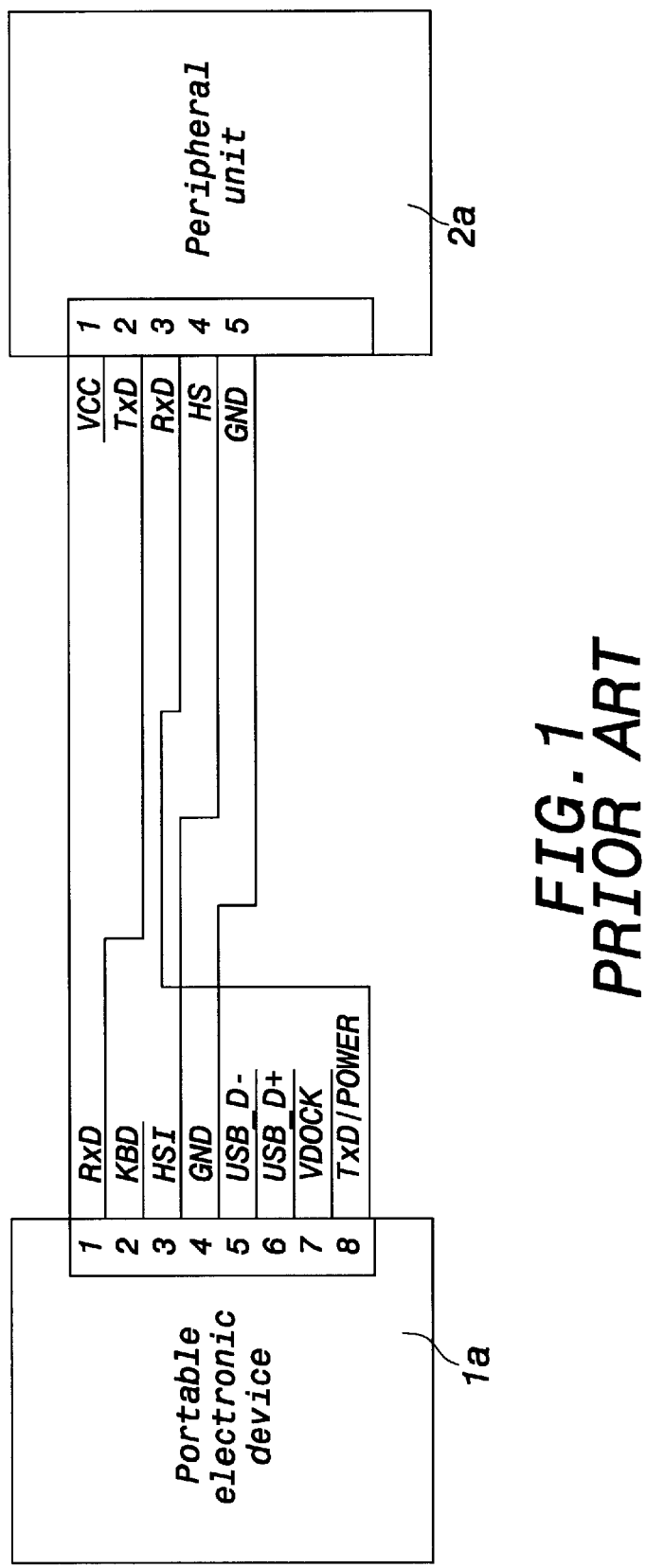
FIG. 1 shows a schematic view of a prior art portable electronic device connected to a peripheral unit.
Figure 2:
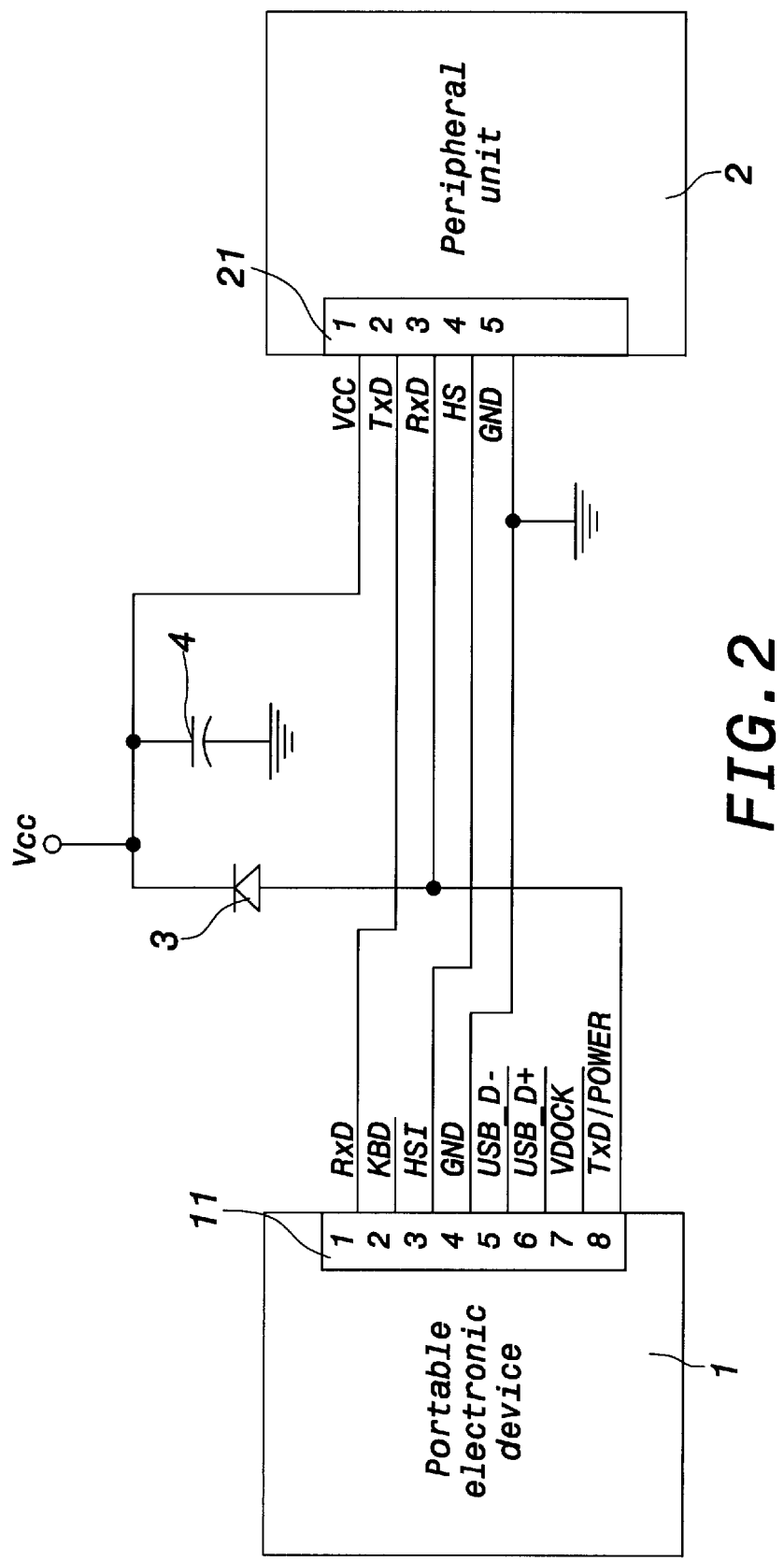
FIG. 2 shows a schematic view of the shared interface device according to a preferred embodiment of the present invention.

The inventive shared interface device is connected between a portable electronic device 1 and a peripheral unit 2. The portable electronic device 1 has a pin 8 defined with transmitting data and power functions and the peripheral unit 2 has a pin 1 for receiving power and a pin 3 for receiving data. The inventive shared interface device is composed of a switch 3 and a energy-storing element 4.

The portable electronic device 1, for example, can be a personal digital assistant (PDA) and a cellulous phone. In the preferred embodiment of the present invention, the portable electronic device 1 is a PDA and has a connector 11 with eight pins. The pins of the connector 11 are assigned to following functions, respectively, receiving data (RxD), synchronized interrupt (HSI), signal ground (GND), and transmitting data/power (TxD/POWER).

In the preferred embodiment of the present invention, the peripheral unit 2 is a keyboard and has a connector 21 with 5 pins. The pins of the connector 21 are assigned with following functions power source (VCC), transmitting data (TxD), receiving data (RxD), synchronized (HS) and signal ground (GND). The TxD pin of the connector 21 is connected to the RxD pin of the connector 11, the RxD pin of the connector 21 is connected to the TxD/POWER pin of the connector 11, the HS pin of the connector 21 is connected to the HSI pin of the connector 11, and the GND pin of the connector 21 is connected to the GND pin of the connector 11.

In the preferred embodiment of the present invention, the switch 3 is a diode with one terminal commonly connected to the TxD/POWER pin of the portable electronic device 1 and the RxD pin of the peripheral unit 2, and another terminal connected to the VCC pin of the peripheral unit 2. The switch 3 is ON when the TxD/POWER pin of the portable electronic device 1 is HI, and is OFF when the TxD/POWER pin of the portable electronic device 1 is LO.

The energy-storing element 4 is an electrolytic capacitor with one terminal connected to the VCC pin of the peripheral unit 2 and another terminal connected to a ground. The energy-storing element 4 is charged to store energy therein when the switch 3 is ON and the energy-storing element 4 is functioned as backup power supply of the peripheral unit 2 when the switch 3 is OFF. The energy-storing element 4 has a capacitance value depending on the transmission speed of data and the duration of the low level period. More particularly, the level of the TxD/POWER pin of the portable electronic device 1 should be turned to high level before the voltage level of the energy-storing element 4 drops to the minimal voltage required by the peripheral unit 2. Therefore, the energy-storing element 4 can be recharged again to supply power for the peripheral unit 2. As can be seen from above description, the energy-storing element 4 should have a larger capacitance value for low-speed data transmission.

Figure 3:
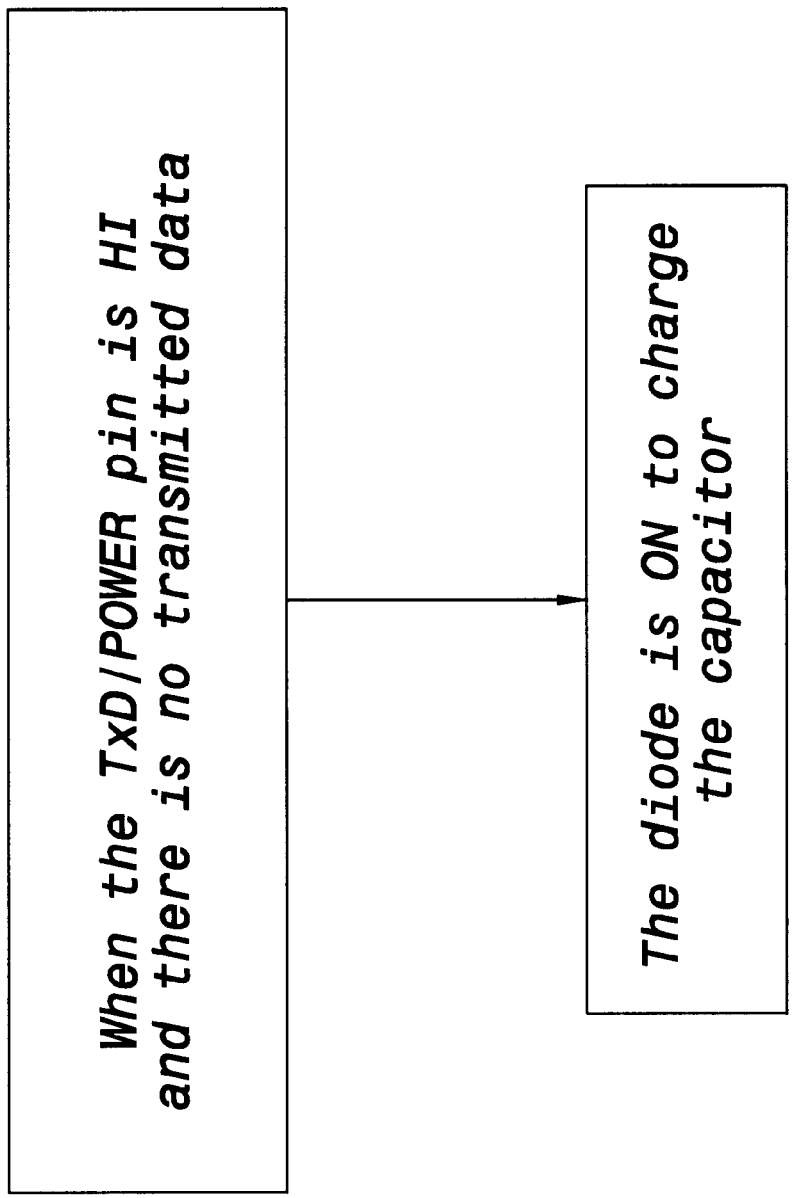
FIG. 3 is a flowchart demonstrating the operation of the present invention.
Figure 4:
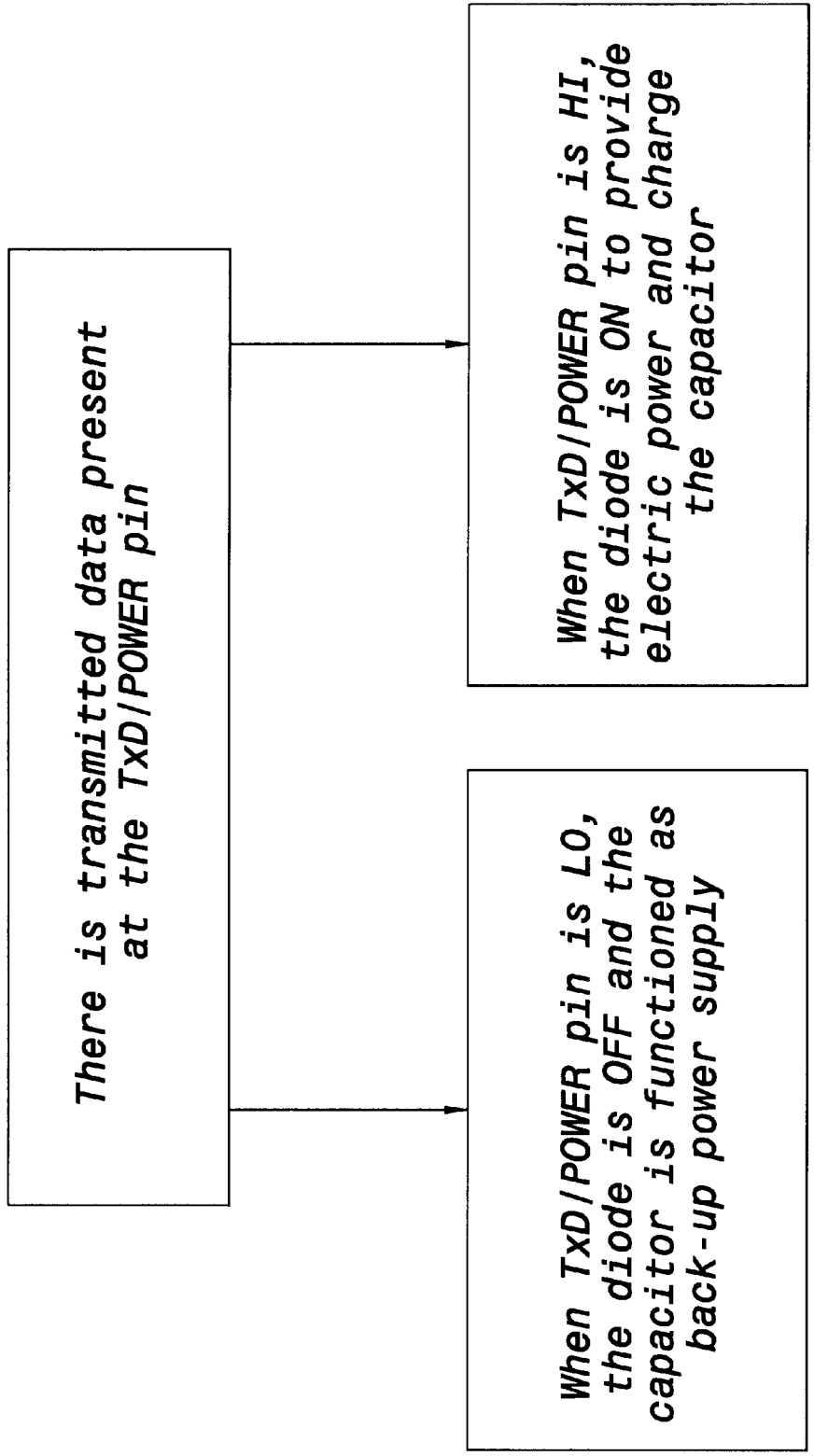
FIG. 4 is another flowchart demonstrating the operation of the present invention.

FIGS. 3 and 4 demonstrate the operation of the present invention. When the TxD/POWER pin of the portable electronic device 1 is HI and there is no transmitted data, the diode 3 is ON to provide electric power to the peripheral unit 2 and charge the energy-storing element 4.

Moreover, when there is transmitted data present and the TxD/POWER pin of the portable electronic device 1 is LO, the diode 3 is OFF and the energy-storing element 4 is functioned as backup power supply of the peripheral unit 2.

Moreover, when there is transmitted data present and the TxD/POWER pin of the portable electronic device 1 is HI, the diode 3 is to provide electric power to the peripheral unit 2 and charge the energy-storing element 4.

Figure 5:
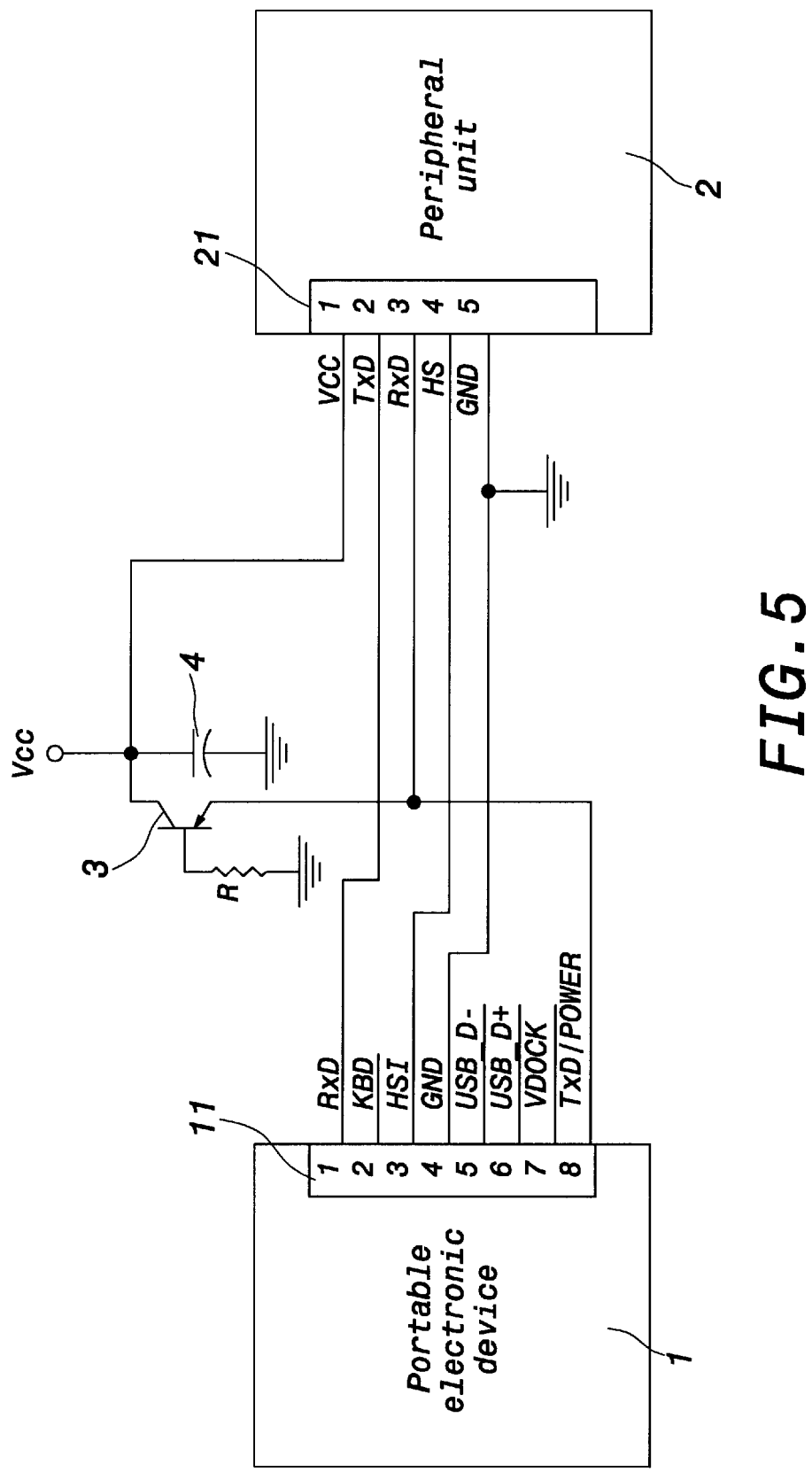
FIG. 5 shows a schematic view of the shared interface device according to another preferred embodiment of the present invention.

FIG. 5 shows another preferred embodiment of the present invention, wherein the switch 3 is a PNP transistor. The PNP transistor 3 has a base connected to one end of a resistor R. The resistor R has another end being grounded. The PNP transistor 3 has a collector connected to the VCC pin of the peripheral unit 2 and an emitter connected to the TxD/POWER pin of the portable electronic device 1 and the RxD pin of the peripheral unit 2.

When the TxD/POWER pin of the portable electronic device 1 is HI and there is no transmitted data, the transistor 3 is ON to provide electric power to the peripheral unit 2 and charge the energy-storing element 4.

Moreover, when there is transmitted data present and the TxD/POWER pin of the portable electronic device 1 is LO, the transistor 3 is OFF and the energy-storing element 4 is functioned as backup power supply of the peripheral unit 2.

Moreover, when there is transmitted data present and the TxD/POWER pin of the portable electronic device 1 is HI, the transistor 3 is ON to provide electric power to the peripheral unit 2 and charge the energy-storing element 4.

To sum up, the shared interface device of the present invention has following advantages:

(1). Both the power supplying function and the data transmission function can be assigned to one pin with no confliction.

(2). Bi-directional data transmission is possible.

(3). The peripheral unit connected to the portable electronic device does not require electrical power per se.

Although the present invention has been described with reference to the preferred embodiment thereof, it will be understood that the invention is not limited to the details thereof. Various substitutions and modifications have suggested in the foregoing description, and other will occur to those of ordinary skill in the art. Therefore, all such substitutions and modifications are intended to be embraced within the scope of the invention as defined in the appended claims.

We claim:

1. A shared interface device providing connection between a portable electronic device and a peripheral unit, the portable electronic device having a plurality of pins with one pin assigned with transmitting data/power supplying function (TxD/POWER pin), the peripheral unit having a plurality of pins with one pin assigned with receiving data function (RxD pin); the shared interface device comprising
a switch having at least two terminals, the switch having a first terminal connected to the TxD/POWER pin of the portable electronic device and the RxD pin of the peripheral unit, the switch being ON when the TxD/POWER pin of the portable electronic device is HI and being OFF when the TxD/POWER pin of the portable electronic device is LO;
an energy-storing element with a first end connected to a second terminal of the switch to supply electrical power to the peripheral unit and a second end connected to ground, the energy-storing element being charged when the switch is ON and used as a backup power supply when the switch is OFF.

2. The shared interface device as in claim 1, wherein the switch is a diode having an anode connected to the TxD/POWER pin of the portable electronic device and the RxD pin of the peripheral unit, and a cathode connected to a power source (VCC) pin of the peripheral unit.

3. The shared interface device as in claim 1, wherein the switch is a PNP transistor having a base connected to one end of a resistor and another end of the resistor connected to ground, the PNP transistor further having a collector connected to a power source (VCC) pin of the peripheral unit, and an emitter connected to the TxD/POWER pin of the portable electronic device and the RxD pin of the peripheral unit.

4. The shared interface device as in claim 1, wherein the energy-storing element is a capacitor.

5. The shared interface device as in claim 1, wherein the portable electronic device is one of a personal digital assistant and a cellulous phone.

6. The shared interface device as in claim 1, wherein the peripheral unit is a keyboard.

* * * * *